United States Patent [19]

Heider et al.

[11] Patent Number: 5,284,356

[45] Date of Patent: Feb. 8, 1994

[54] TRANSPORTING SYSTEM AND METHOD FOR USING SAME

[76] Inventors: Merle J. Heider, 203-12th St., SW.; Dale J. Heider, 1108 8th Ave., SW.; Leon J. Heider, 1107 Third Ave., SW., all of Humboldt, Iowa 50548

[21] Appl. No.: 893,719

[22] Filed: Jun. 5, 1992

[51] Int. Cl.$^5$ .............................................. B60D 1/00
[52] U.S. Cl. ........................... 280/425.1; 280/438.1; 280/476.1
[58] Field of Search .............. 280/415.1, 416.1, 416.2, 280/418, 425.1, 433, 438.1, 457, 461.1, 476.1

[56] References Cited

U.S. PATENT DOCUMENTS

| | | | |
|---|---|---|---|
| 2,360,902 | 10/1944 | Simmons | 280/461.1 |
| 3,542,399 | 11/1970 | Myers | 280/416.2 |
| 3,717,363 | 2/1973 | Berends | 280/425.1 |
| 4,288,091 | 9/1981 | Umeda et al. | 280/416.1 |
| 4,391,334 | 7/1983 | Carrick | 280/476.1 |
| 4,418,933 | 12/1983 | Wilcox | 280/415.1 |
| 4,589,670 | 5/1986 | Sweetin | 280/418 |
| 5,090,720 | 2/1992 | Heider et al. | 280/438.1 |

FOREIGN PATENT DOCUMENTS

| | | | |
|---|---|---|---|
| 1416364 | 8/1988 | U.S.S.R. | 280/416.1 |
| 1579839 | 7/1990 | U.S.S.R. | 280/476.1 |

*Primary Examiner*—Margaret A. Focarino
*Assistant Examiner*—A. M. Boehler
*Attorney, Agent, or Firm*—Zarley, McKee, Thomte, Voorhees & Sease

[57] ABSTRACT

A transporting system includes a farm tractor, a dolly having a fifth wheel assembly thereon, and an over-the-road trailer. The dolly can be connected to the tractor by means of a three point hitch. The fifth wheel assembly of the dolly includes a fifth wheel plate adapted to retentively engage the king pin of the over-the-road trailer. The dolly can be attached to the trailer and pulled by the tractor to a desired location.

3 Claims, 2 Drawing Sheets

TRANSPORTING SYSTEM AND METHOD FOR USING SAME

BACKGROUND OF THE INVENTION

The present invention relates to a transporting system and method for using same.

Farm tractors have the power to move large amounts of grain out of the field to bins and from bin sites to market. However, farm tractors are not adapted to pull a trailer from a conventional over-the-road tractor trailer combination. This is because the weight of the forward end of the trailer renders a conventional farm tractor unstable, and there is no adequate coupling means between a conventional farm tractor and a conventional over-the-road trailer.

Therefore, a primary object of the present invention is the provision of an improved transporting system and method for using same.

A further object of the present invention is the provision of an improved transporting system which utilizes a fifth wheel dolly which can be connected to the three point hitch of a conventional farm tractor.

A further object of the present invention is the provision of an improved transporting system which utilizes a dolly having a fifth wheel plate thereon which is adapted to be coupled to the king pin of conventional over-the-road trailer.

A further object of the present invention is the provision of an improved transporting system which includes a dolly having a fifth wheel plate thereon which is movable between a lowered and an elevated position for lifting the front end of a conventional over-the-road trailer.

A further object of the present invention is the provision of an improved transporting system which is economical to manufacture, durable in use, and efficient in operation.

SUMMARY OF THE INVENTION

The present invention utilizes a dolly that is adapted to be mounted to the three point hitch of a farm tractor and which is also adapted to be connected to the king pin of a conventional over-the-road grain trailer. The dolly includes supporting wheels of its own which bear the weight of the trailer during transporting.

The dolly includes a fifth wheel plate which can be raised and lowered by a hydraulic cylinder. The plate is first moved into retentive engagement with the king pin of the over-the-road trailer, and then the fifth wheel plate is lifted so as to raise the front end of the over-the-road trailer, thereby causing the weight of the over-the-road trailer to be borne by the fifth wheel.

The dolly includes means by which it can be connected to the three point hitch of a conventional farm tractor. Thus, the farm tractor can be connected to the dolly, and the dolly moved into retentive engagement with a grain trailer full of grain. The dolly plate is lifted to raise the front end of the grain trailer, and the trailer is transported to the desired location. The fifth wheel plate can then be lowered so that the over-the-road trailer is supported by legs on its forward end. The dolly is then disconnected from the trailer and can be used to move other trailers.

The trailer can be provided with extra large pads under the landing legs so as to give extra support so that the trailers can set on soft ground such as in an agricultural field. The trailer or trailers can be filled in the field and the tractor used to move the trailer to a desired location.

DESCRIPTION OF THE PREFERRED EMBODIMENT

Figure 1:
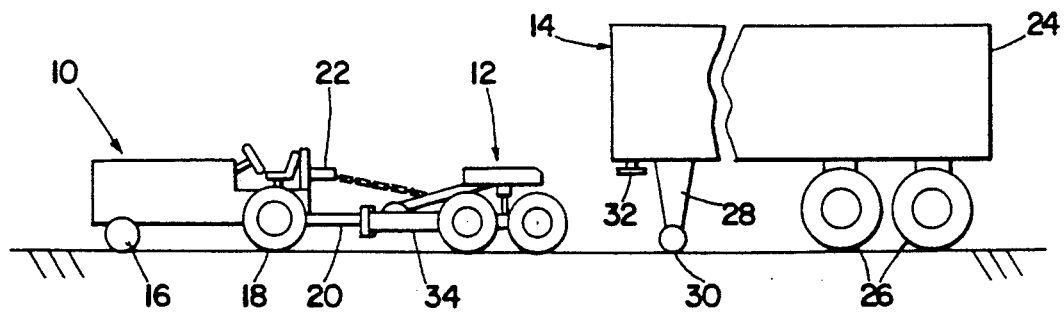
FIG. 1 is an elevational view of the tractor, the dolly, and the trailer of the transporting system of the present invention.

Referring to the drawings, the transporting system of the present invention comprises a tractor 10, a dolly 12, and a trailer 14. Tractor 10 includes tractor wheels 16, 18, and a pair of lift arms 20 and center link 22 which form a conventional three point hitch.

Trailer 14 comprises a trailer box 24 having rear wheels 26 and forward support legs 28. Support legs 28 include support pads 30 at their lower ends. Support pads 30 may be made larger than normal so as to provide adequate support for the front end of the trailer when the trailer is placed within the soft soil of an agricultural field. Mounted on the forward end of trailer 14 is a king pin 32 which is adapted to fit within a conventional fifth wheel plate.

Dolly 12 comprises a dolly frame 34 which includes side frame members 36, 38, front frame members 40, 42, and rear frame member 44.

Connected to the forward end of frame member 34 is a tow bar 46. A hitch pin 48 extends through a clevis 50 which is mounted to the tow bar 46. Tow bar 46 also includes a pair of lift arm couplings 52, 54. A hitch chain 56 has its opposite ends connected to forward frame members 40, 42, and extends forwardly therefrom to a hitch link coupling 58. The armed couplings 52, 54 are adapted to be connected to the lift arms 20 of tractor 10, and the hitch link coupling 58 is adapted to be connected to the center link 22 of the three point hitch on tractor 10.

Mounted to dolly frame 34 are a pair of tandem axles 60, 62 which have wheels 64 rotatably mounted thereto.

Also mounted to dolly frame 34 is a fifth wheel assembly designated generally by the numeral 66 and which includes a fifth wheel plate 68 having a coupling slot 70 therein. Extending outwardly from the sides of fifth wheel coupling plate 68 are a pair of connecting pins 90. A fifth wheel link 72 includes a forward end 74 which is pivotally mounted to frame 34 by means of ear flanges 76 and pin 78. Link 72 includes a pair of rearwardly extending fork members 80, 82 which are pivotally mounted at the rearward ends over connecting pin 90.

A pair of cylinders 86 are pivotally mounted at their lower ends to a cylinder mount frame 84 for pivotal movement about an axis pin 85. Cylinder 86 is a cylinder rod 88 which is pivotally mounted over connecting pin 90 of fifth wheel 68. Thus, by extension of hydraulic cylinder 86, it is possible to raise fifth wheel plate 68 from its lowered position shown in FIG. 2 to an elevated position shown in shadow lines in FIG. 2.

In operation, the trailer 14 is left in the field and filled with grain as the harvest is made. The tractor 10 is then hitched by means of its three point hitch to the dolly 12. The dolly 12 is then backed toward the trailer 14 until the king pin 32 slides within slot 70 of fifth wheel plate 68 and is retentively engaged therein. Then hydraulic cylinder 86 is actuated to lift the fifth wheel plate 68 and the forward end of trailer 14 upwardly from the lowered to the elevated position shown in shadow lines in FIG. 2. This causes the support pads 30 to be lifted upwardly off of the supporting ground, and places the weight of the forward end of the trailer 14 on the dolly 12 and its supporting wheels 64. The tractor can then be used to transport the device to any desired location at which time the fifth wheel plate 68 is detached from the king pin 32, and the dolly is then free for use with another trailer.

Figure 2:
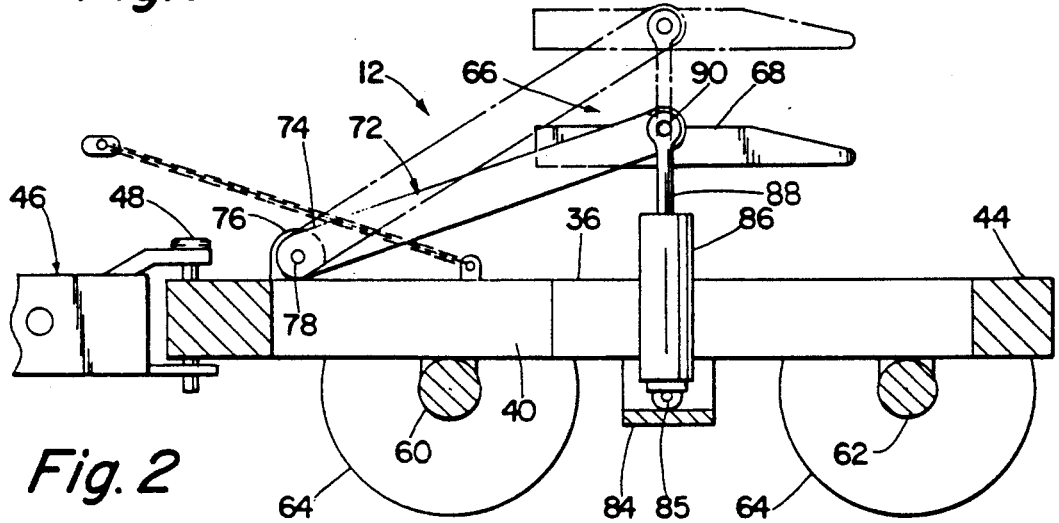
FIG. 2 is a sectional side view taken of the dolly of the present invention.
Figure 3:
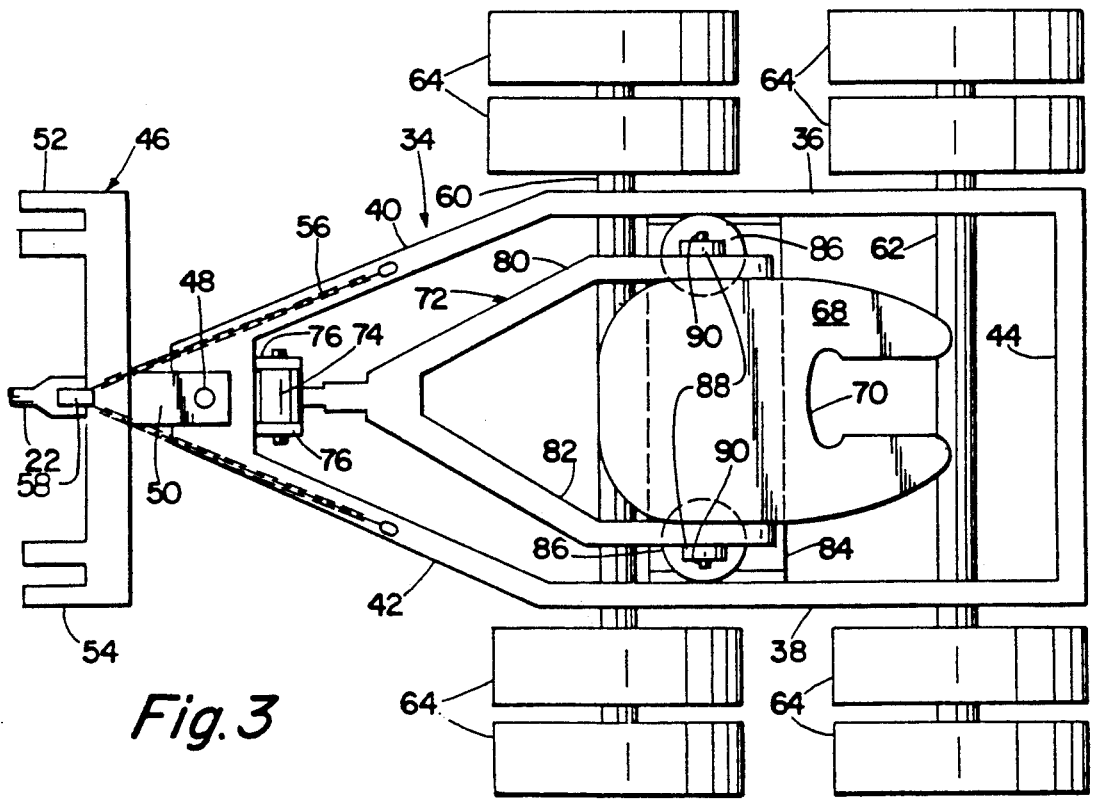
FIG. 3 is a top plan view of the dolly shown in FIG. 2.
Figure 4:
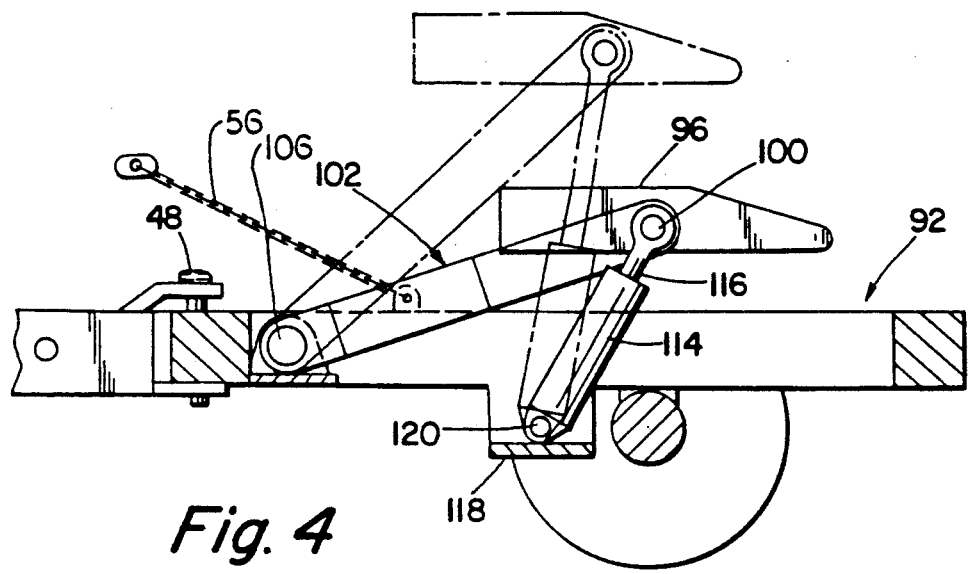
FIG. 4 is a side sectional view taken of a modified form of the dolly of the present invention.
Figure 5:
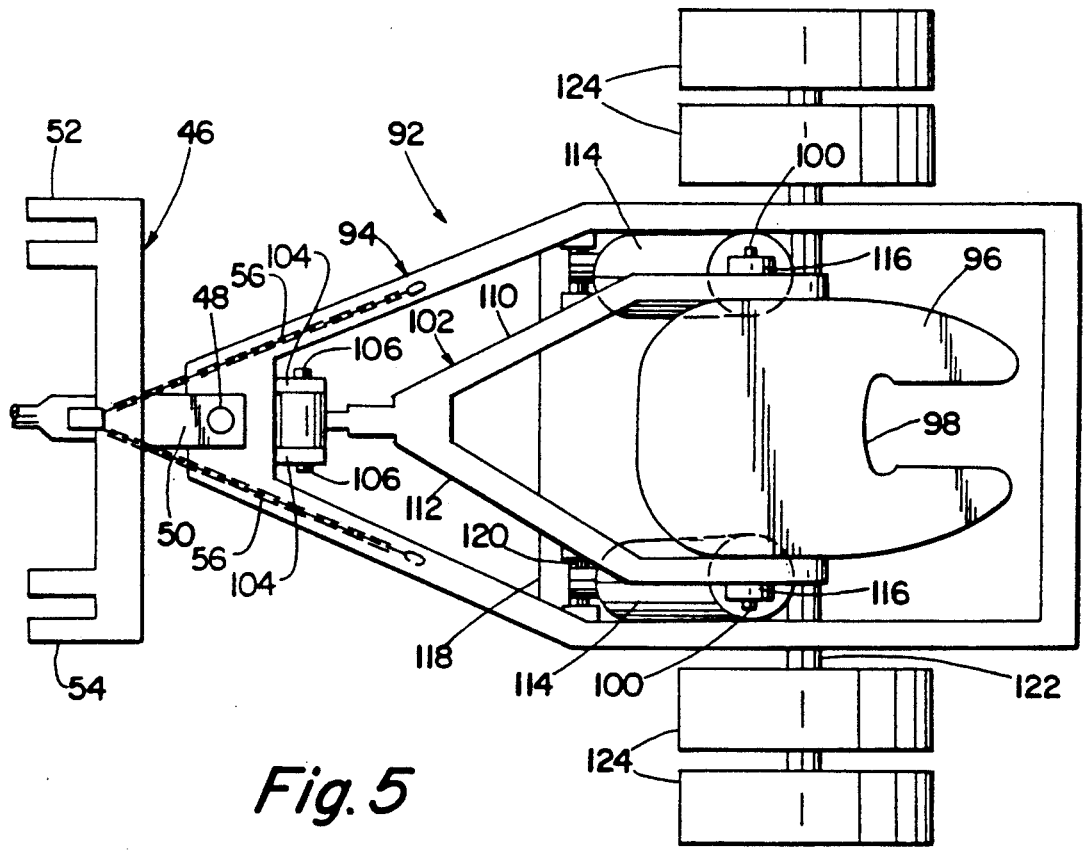
FIG. 5 is a top plan view of the modified form of dolly shown in FIG. 4.

Referring to FIGS. 4 and 5, a modified form of the invention is shown utilizing a single axle as opposed to the tandem axle shown for the dolly in FIGS. 2 and 3. The modified dolly 92 includes a dolly frame 94, and a dolly plate 96 having a coupling slot 98 therein. A pair of connecting pins 100 extend outwardly from the side edges of dolly plate 96. A fifth wheel link 102 is pivotally connected at its forward ends to a pair of ear flanges 104 by means of a pivot pin 106. Link 102 includes a pair of spaced apart fork arms 110, 112 which are pivotally mounted over the connecting pins 100 of fifth wheel plate 96. A pair of cylinders 114 each include a piston rod 116 and are each connected at their lower ends to a cylinder mount frame by means of a lower mounting pin 120. The upper ends of the piston rods are pivotally mounted over the connecting pins 100 of fifth wheel plate 96.

Frame 94 is supported by means of a single axle 122 having ground engaging wheels 124 thereon. The tow bar 146 is identical in construction to the one shown in FIGS. 2 and 3, and therefore, corresponding numerals are utilized in FIG. 5.

One advantage provided by the present invention is the ability to transfer weight of the front end of trailer 14 to the rear wheels 18 of the tractor 10 so as to increase the traction of wheels 18 when desired. This can be accomplished by raising lift arms 20 with the hydraulic lift of the tractor. These lift arms 20 in combination with chain 56 cause lifting of the entire dolly 12, 92 which causes the weight of trailer 14 to be transferred from the wheels 64 of dolly 12 to the rear wheels 18 of tractor 10. Thus, when mud, snow, ice, or other slippery conditions are encountered, the traction of wheels 18 can be increased to the extent needed by gradually lifting the lift arms 20. When a support surface having good traction is encountered, the lift arms can be lowered to again transfer the weight of the front of trailer 14 to the wheels 64, 124 of the dolly 12, 92.

Thus, it can be seen that the device accomplishes at least all of its stated objectives.

We claim:

1. A method for transporting a trailer having a storage box with forward and rear ends, ground engaging wheels rotatably mounted to said storage box adjacent said rear end thereof, a pair of support legs having supper ends connected to said box having lower ends engaging the ground, and a king pin connected to said box adjacent said forward end thereof, said method comprising:

connecting a three point hitch of an agricultural tractor having front wheels and rear drive wheels to a dolly having a dolly frame, ground engaging wheels rotatably mounted to said dolly frame, and a fifth wheel assembly mounted to said frame, said fifth wheel assembly comprising a fifth wheel plate adapted to retentively engage said king pin of said trailer, link means movably mounting said fifth wheel plate to said dolly frame for movement between a lowered and an elevated position, and power means for moving said fifth wheel plate between said lowered and said elevated positions;

actuating said power means to move said fifth wheel plate to a height registered with the height of said king pin;

using said tractor to move said dolly toward said king pin until said fifth wheel plate moves into retentive engagement with said king pin;

actuating said power means to move said fifth wheel plate to said elevated position for lifting said lower ends of said support legs off the ground and transferring the weight of said forward end of said box onto said dolly, said tractor being free from bearing the weight of said forward end of said box;

gradually raising said three point hitch to raise said dolly after said fifth wheel plate retentively engages said king pin and after said step of said lifting of said support legs off the ground until the desired amount of weight of said forward end of said trailer is transferred to said rear drive wheels of said tractor to increase traction of said drive wheels to a desired amount on a supporting surface.

2. A method according to claim 1 wherein said connecting of said three point hitch to said dolly comprises connecting a pair of side arms of said three point hitch to said dolly and connecting the opposite ends of an elongated flexible member to a center link of said three point hitch and to said dolly, respectively.

3. A method according to claim 2 wherein said connecting of said side links to said dolly comprises connecting said side links to a tow bar and connecting said tow bar to said dolly.

* * * * *